Sept. 30, 1958     J. P. ADAMSON     2,853,825
MULTI-USE FISHING PLUG
Filed Sept. 15, 1955     2 Sheets-Sheet 1
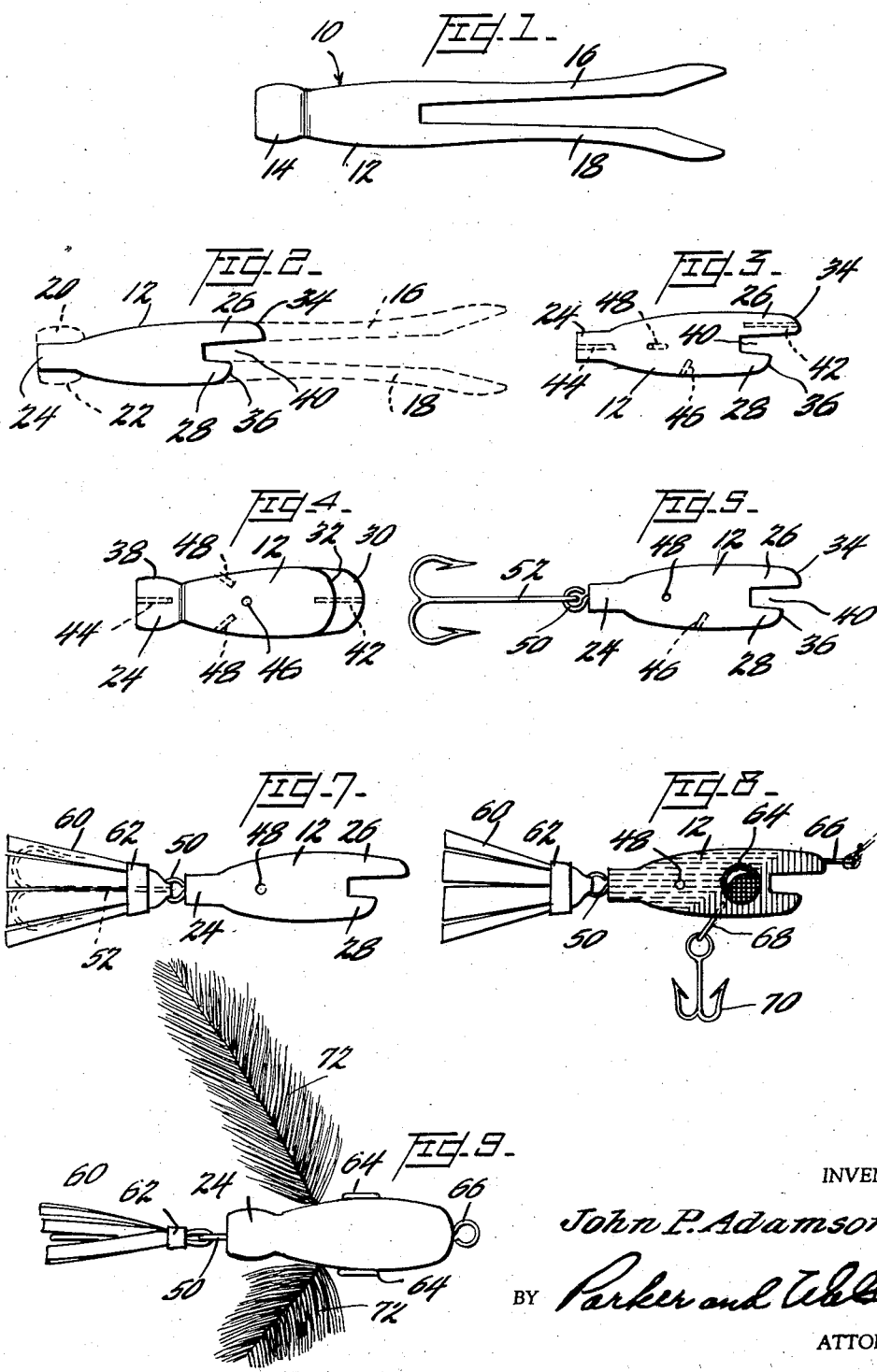
INVENTOR
John P. Adamson,
BY Parker and Welch
ATTORNEYS

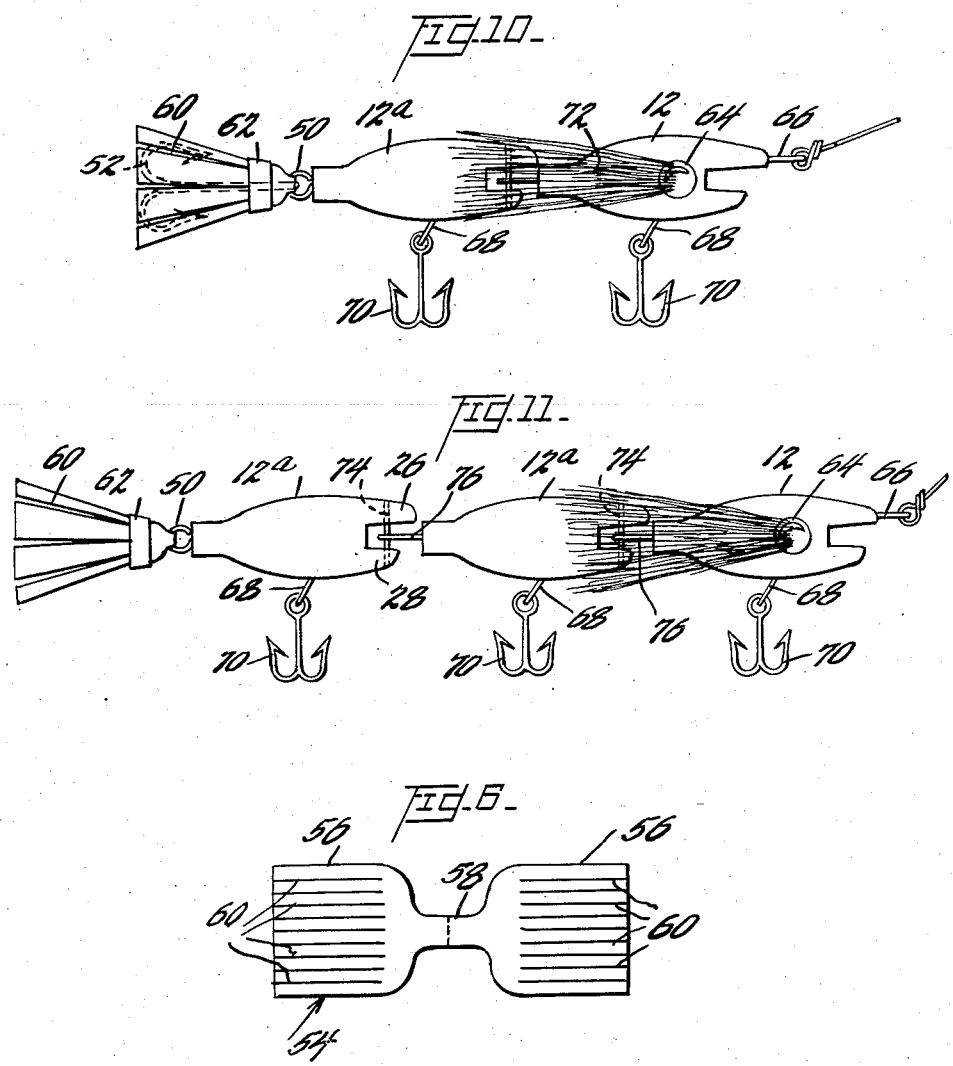

United States Patent Office 2,853,825
Patented Sept. 30, 1958

2,853,825

MULTI-USE FISHING PLUG

John Paul Adamson, Holyoke, Colo.

Application September 15, 1955, Serial No. 534,460

18 Claims. (Cl. 43—42.15)

This invention relates to a multi-use fishing lure of the plug type.

According to this invention, the lure is made in a plurality of sections of generally similar construction. The sections are so devised and constructed that one or more of them may be joined together to be used conjointly or a single one may be used alone. The selection of the number to be used will depend upon the type of fish to be caught or upon the fisherman's opinion as to what type of bait he believes will be most attractive to the fish he seeks to catch.

Since the parts of the device are interchangeable to the extent to be indicated, the fisherman is afforded a relatively wide selection of different types of bait for a comparatively small investment.

Although I may construct my plugs from any suitable source of wood, I find it especially convenient to begin my construction from materials that have been processed for other purposes. In this way, I am able to effect substantial economies in the primary processing of the materials of my invention.

My invention may be best understood by reference to the accompanying drawings showing a step-by-step exhibition of the construction of my invention. In the drawings:

Figure 1 is a side view of a conventional, one-piece, wood clothespin, with which I prefer to start;

Figure 2 shows the removal of parts of Figure 1;

Figure 3 shows additional steps performed on the blank of Figure 2;

Figure 4 is a bottom plan view of Figure 3;

Figure 5 shows additional steps performed on the blank of Figure 3;

Figure 6 shows the pattern for the blank from which the shroud for the rear hook is made;

Figure 7 shows still further steps performed on the blank of Figure 5;

Figure 8 is a side elevation of one completed form of the invention, with feathers omitted for a better view of the invention;

Figure 9 is a top plan view of the invention as shown in Figure 8;

Figure 10 is a side view of another form of the invention; and

Figure 11 is a side view of still another form of the invention.

Referring now to the drawing, I prefer to begin with a conventional, one-piece, clasp-type, wood clothespin, such as is widely available. I use the older, substantially cylindrical pin rather than the type of rectangular cross-section such as is made to prevent rolling. This pin, designated by reference numeral 10, has a body 12, a head 14 and two legs 16 and 18, all integrally constructed from a single wooden blank.

Viewing the pin from the side, with the leg 16 uppermost, I begin by slicing off upper 20 and lower 22 portions of the head 14 leaving the portion 24. I next cut off the outer ends 16 and 18 of the legs, leaving the remainder of leg 16 longer at 26 than the corresponding portion 28, which will form the lower portion of the plug. I prefer to round off these stumps 26 and 28 in the horizontal plane 30 and 32 as well as the vertical planes 34 and 36, leaving only the slot 40 with a straight edge. The edge of the portion 24 is also rounded at 38 but to a lesser degree. Up to this point, the blank may be used in more than one way as will be explained subsequently.

For the primary unit of my lure, five holes are drilled. In the upper stump 26, hole 42 extends lengthwise of the body. In the after section 24, hole 44 also extends lengthwise of the body. Each of the holes 42 and 44 are centered in the cross-section of the wood in which they are drilled. On the underside of the body 12, about midway of its length, hole 46 is drilled sloping forwardly. Two holes 48 are drilled, one on each side, somewhat to the rear of the mid-point of body 12 and sloping forwardly therein.

In assembling the lure, I prefer to place a screw-eye 50 with partly opened eye in the hole 44. This eye 50 is intended to serve as the mounting for hook 52. It is usually desirable to shield the hook from weeds as well as to make the lure more attractive by means of some type of shrouding material. Although any suitable shroud may be employed, I prefer to use the one illustrated in the drawings. As shown in Figure 6 a piece of goods 54 of generally hour-glass shape with end sections 56 and a narrow neck 58 is used as the starting blank. This blank is cut from plastic coated fabric material of the type frequently employed for upholstering material and the covering of waterproof cushions. I prefer to use the type of fabric where the coating material penetrates both sides of the fabric rather than that which is coated on only one side. The ends 56 are slit evenly lengthwise into a plurality of lashes 60.

The blank 54 is folded end-to-end and the neck 58 is passed into the opened eye 50 after which the eye may be closed. The lashes 60 are gathered tightly about eye 50 and they are secured about the eye by means of a thin metal band 62 which is crimped into position to hold the lashes in position to conceal the hook 52.

In the event that the fisherman considers a bare hook of greater advantage than a shrouded hook, it is appropriate to use hook 52 bare or to employ another form of hook such as the three pronged type shown at 70.

At this point, it is convenient to paint the plug. Various decorative schemes may be employed according to the particular views held by the maker or prospective user of the lure. Some fishermen believe that the plug should closely simulate natural bait while others believe that any color is satisfactory as long as it is bright and calculated to catch the eye of a fish. I prefer to decorate the plug by means of dipping, holding the article for dipping by means of the tail hook. It is desirable to temporarily plug the holes 42, 44 and 48 by means of small wooden pegs while dipping. Generally an undercoat should be employed followed by at least one additional outer coat. If a contrasting head color is desired, it may be applied by a third partial dip to produce an effect such as is shown in Figure 8. An eye marking 64 may be applied either by painting or by affixing suitable discs to the sides of the body 12.

After painting, the plugs may be removed from holes 42 and 46 and screw-eyes 66 and 68 respectively placed therein. Eye 66 is used for attaching a line while eye 68 serves as a mounting for hook 70. This form of the invention is completed by the addition of feathers 72 mounted in holes 48 by means of adhesive cement. I prefer to employ marabou feathers for this purpose.

In the form of the invention shown in Figure 10, a second body 12a is finished in substantially the same manner as that shown in Figures 3 and 4. However, no holes 42 or 48 are drilled and instead, a pin 74 is passed between stumps 26 and 28. Such pin 74 cooperates with eye 76 in the after part of body 12 to form a swivel connection between bodies 12 and 12a, the form of the invention shown in Figure 10 is completed by a tail hook 52.

It is pointed out that the embodiment shown in Figure 9 may be converted to the embodiment shown in Figure 10 by the removal of tail hook 52 from the embodiment of Figure 9 and the insertion of unit 12a between the hook 52 and the unit 12 and conversely, the embodiment of Figure 10 may be converted to the embodiment of Figure 9 by the removal of unit 12a. Similarly, the embodiment of Figure 11 is formed from a head unit 12, two intermediate units 12a and the tail unit 52.

Thus it will be seen that I have devised a fishing lure that may be assembled in a number of different ways in order to provide a variety of plug types according to the fisherman's appraisal of the probable success of one type or another. The method of assembly and disassembly is simple, quick and does not require any special tools. The method of manufacture is novel and the resultant lure is highly attractive.

I claim:

1. A fishing lure of the wood-plug type comprising a first body section of generally cylindrical shape; the front part thereof having a lower portion receding with respect to the upper portion, an open, unobstructed horizontal slot between the upper and lower portions; the rear portion of the body having a rounded taper blending into a constricted neck; an after part extending to the rear of the neck, enlarged with respect to the neck but of lesser cross-section than the body; a support for a fishhook on the underside of the body; feathers extending outwardly from the sides of the body rearwardly of the mid point of the body; a second body section of generally cylindrical shape; the front part thereof having a lower portion receding with respect to the upper portion, a horizontal slot between the upper and lower portions; the rear portion of the body having a rounded taper blending into a constricted neck; an after part extending to the rear of the neck, enlarged with respect to the neck but of lesser cross-section than the body; a support for a fishhook on the underside of the body; a jointed connection between the after part of the first body and the slot of the second body; a tail hook secured to the after part of the second body and a weed guard for the tail hook made up of lashes formed of coated fabric.

2. A fishing lure of the wood-plug type comprising a first body section of generally cylindrical shape; the front part thereof having a lower portion and upper portion, a horizontal slot between the upper and lower portions; the rear portion of the body having a rounded taper blending into a constricted neck; an after part extending to the rear of the neck, enlarged with respect to the neck but of lesser cross-section than the body; a support for a fishhook on the underside of the body; a second body section of generally cylindrical shape; the front part thereof having a lower portion and an upper portion, a horizontal slot between the upper and lower portions; the rear portion of the body having a rounded taper blending into a constricted neck; an after part extending to the rear of the neck, enlarged with respect to the neck but of lesser cross-section than the body; a support for a fishhook on the underside of the body; a jointed connection between the after part of the first body and the slot of the second body; and a tail hook secured to the after part of the second body.

3. The combination of claim 2 wherein a third body section of similar configuration to the second body section is inserted between the first and second sections with a similar jointed connection between each section.

4. The combination of claim 2 wherein the connection between the sections consists of a screw-eye in the first section and a vertical pin extending across the slot of the second section and wherein the tail hook is secured to the second portion by a second screw-eye of the same size as the first, whereby a non-jointed lure may be formed by removing both screw-eyes and putting the second in place of the first.

5. A head-section of a multi-purpose fishing lure of the wood-plug type comprising a generally cylindrical body having a head end, a line connection formed therein, a horizontal slot in said head end; a support for a fishhook on the underside of the body; the rear portion of the body having a rounded taper blending into a constricted neck; an after end larger than the neck but of lesser cross-section than the body, feathers extending outwardly from the sides of the body rearwardly of the mid-portion of the body and a hole in the after part for receiving a screw-eye.

6. The subcombination of claim 5 wherein eye markings are applied to the head end thereof.

7. The subcombination of claim 5 wherein the feathers are marabou.

8. The subcombination of claim 5 wherein the head end has an upper portion above the slot extending forwardly of the lower portion below the slot, the line connection being formed in the upper portion.

9. An intermediate section of a multi-purpose fishing lure of the wood-plug type comprising a generally cylindrical body; a head end, a slot therein, a pin extending across the slot, adapted to pass through a screw-eye; a support for a fishhook on the underside of the body; the rear portion of the body having a rounded taper blending into a constricted neck; an after end larger than the neck but of less cross-section than the body and a hole in the after end for receiving a screw-eye.

10. The subcombination of claim 9 wherein the slot extends horizontally in said head between upper and lower portions, the upper portion extending forwardly of the lower section.

11. A fishing lure of the wood-plug type formed of conventional, one-piece clasp-type clothespins including a first body section cut from the body of the pin and including a portion of each of the legs thereof and a portion of the head thereof; the leg portions forming the head end of the section and having a line connection; the head portion of the pin forming the after end of the section and having connecting means for connecting the section to another section; a second body section formed similarly to the first section, the head end having cooperative connecting means for connection with the first section and the after end having means for receiving a support for a hook.

12. The combination of claim 11 wherein the connection between the sections includes a screw-eye held in the first section and a pin for the second section passing through the eye of the screw and the stumps of the legs.

13. The combination of claim 11 wherein the head end of the first section includes two unequal portions of the legs of the pin, the larger portion being arranged uppermost.

14. A head section of a multi-purpose fishing lure of the wood-plug type, formed of a conventional, one-piece clasp-type clothes-pin including a body cut from the body of the pin and including portions of the legs and at least a portion of the head of the pin, the remaining portions of the legs being unequal in length, a line connection fixed in the longer of the former leg portions; a support for a fishhook in the underside of the plug body; feathers extending outwardly and affixed to the sides of the plug body back of the mid-portion thereof and a hole in the head of the former pin for receiving a screw-eye.

15. The subcombination of claim 14 wherein the feathers are marabou.

16. The subcombination of claim 14 wherein the cut leg portions of the pin are rounded off on all sides save the kerf portion of the pin.

17. A tail or intermediate section of a multi-purpose fishing lure of the wood plug type, formed of a conventional one-piece, clasp-type, clothes-pin including a body cut from the body of the pin and including portions of the legs and at least a portion of the head of the pin; a pin passing through the remaining portions of the legs to form with said remaining portions, a pin-and-clevis for securing the eye of a screw-eye; a support for a fish-hook in the underside of the plug body; and a hole in what was formerly the head of the clothespin, for receiving a screw-eye.

18. The subcombination of claim 17 wherein the stumps of the legs are of differing length.

References Cited in the file of this patent

UNITED STATES PATENTS

| | | |
|---|---|---|
| D. 161,820 | Brooks | Feb. 6, 1951 |
| 1,477,756 | Heddon et al. | Dec. 18, 1923 |
| 1,540,702 | Morriss | June 2, 1925 |
| 1,589,065 | Gere et al. | June 15, 1926 |
| 1,692,935 | Heddon | Nov. 27, 1928 |
| 1,884,053 | McGarraugh | Oct. 25, 1932 |
| 1,997,900 | Edwards | Apr. 16, 1935 |
| 2,111,020 | Arbogast | Mar. 15, 1938 |
| 2,334,792 | Royston | Nov. 23, 1943 |
| 2,478,801 | Yungel | Aug. 9, 1949 |
| 2,627,136 | Sinclair | Feb. 3, 1953 |